(12) United States Patent
Carnevali

(10) Patent No.: US 9,122,942 B2
(45) Date of Patent: Sep. 1, 2015

(54) SCANNER CRADLE

(71) Applicant: Jeffrey D. Carnevali, Seattle, WA (US)

(72) Inventor: Jeffrey D. Carnevali, Seattle, WA (US)

( * ) Notice: Subject to any disclaimer, the term of this patent is extended or adjusted under 35 U.S.C. 154(b) by 0 days.

(21) Appl. No.: 14/174,039

(22) Filed: Feb. 6, 2014

(65) Prior Publication Data

US 2015/0220765 A1  Aug. 6, 2015

(51) Int. Cl.
*G06K 7/10* (2006.01)
*G06K 9/22* (2006.01)

(52) U.S. Cl.
CPC ................................. *G06K 7/10881* (2013.01)

(58) Field of Classification Search
USPC ........................................ 235/462.01–472.03
See application file for complete search history.

(56) References Cited

U.S. PATENT DOCUMENTS

| | | | | |
|---|---|---|---|---|
| 5,155,346 A | * | 10/1992 | Doing et al. | 235/462.45 |
| 5,736,726 A | * | 4/1998 | VanHorn et al. | 235/472.02 |
| 5,949,052 A | * | 9/1999 | Longacre et al. | 235/462.08 |
| 6,053,413 A | * | 4/2000 | Swift et al. | 235/472.01 |
| 6,595,422 B1 | * | 7/2003 | Doljack | 235/462.42 |
| 6,616,049 B1 | * | 9/2003 | Barkan et al. | 235/472.03 |
| 6,860,427 B1 | * | 3/2005 | Schmidt et al. | 235/462.32 |
| 8,590,795 B2 | * | 11/2013 | Vincenzi | 235/472.02 |
| 2005/0082371 A1 | * | 4/2005 | Schmidt et al. | 235/462.45 |
| 2009/0057422 A1 | * | 3/2009 | Dugas et al. | 235/494 |
| 2009/0218405 A1 | * | 9/2009 | Joseph et al. | 235/462.42 |
| 2011/0073658 A1 | * | 3/2011 | Vassura et al. | 235/472.01 |

\* cited by examiner

*Primary Examiner* — Tuyen K Vo
(74) *Attorney, Agent, or Firm* — Charles J. Rupnick Attorney at Law

(57) ABSTRACT

A scanner cradle having a receiver formed as a cup shaped container with an interior cavity sized to receive a hand-held scanner device thereinto with the head portion of the scanner device seated therein and a handle portion thereof protruding therefrom, wherein the receiver further includes: an opening communicating with the interior cavity and a slot formed through a sidewall thereof extending partially therealong along, and an aperture communicating through a bottom thereof opposite of the opening; opposing friction members protruding into the slot from opposite walls thereof; and a releasable retention joint between each of the friction members and the walls of the slot.

20 Claims, 7 Drawing Sheets

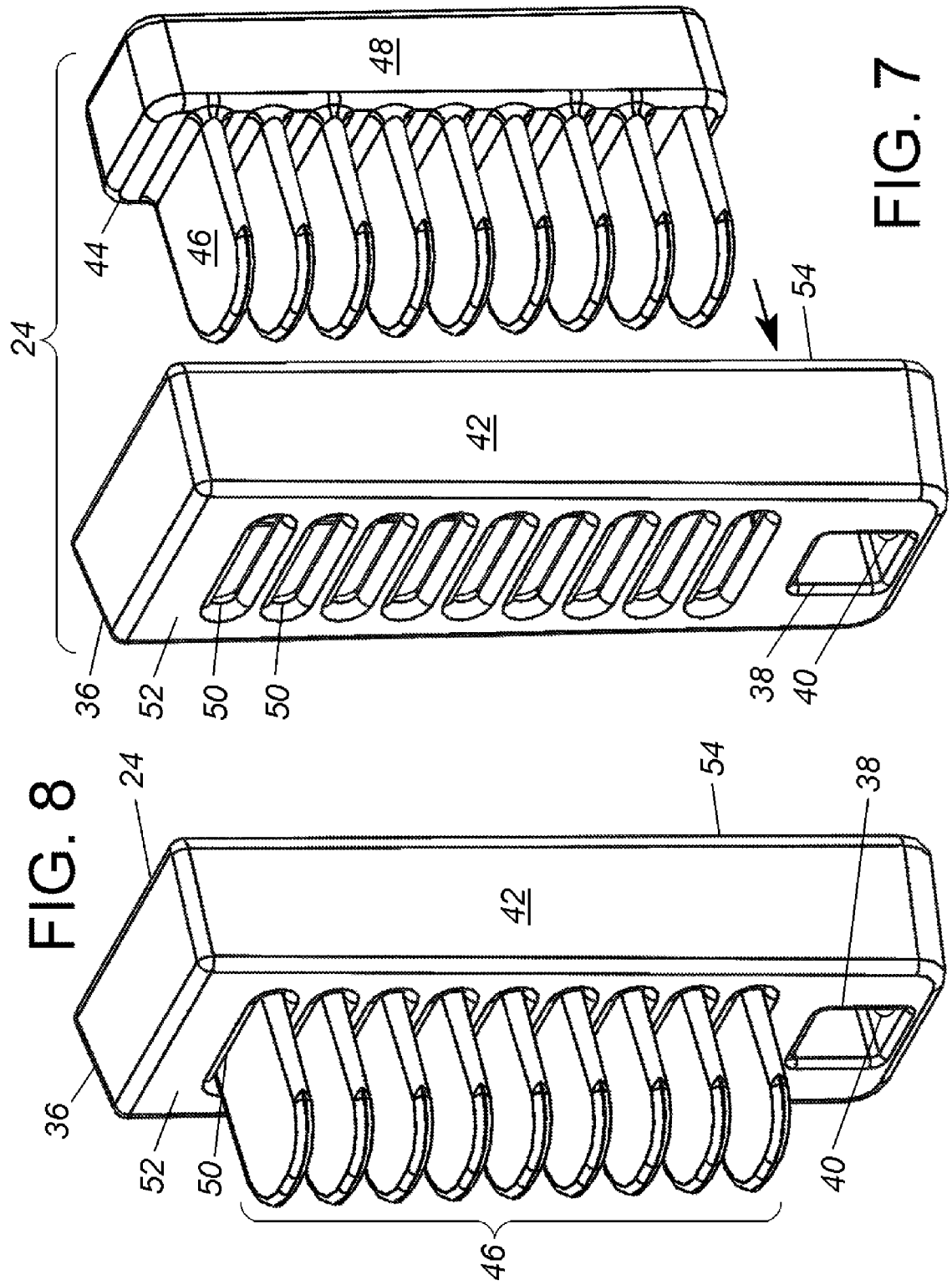

SCANNER CRADLE

FIELD OF THE INVENTION

The present invention relates to a cradle for securing a portable electronic device, and in particular to a cradle for securing a portable UPC bar code scanner.

BACKGROUND OF THE INVENTION

Handheld portable bar code scanners having pistol-type grips are generally well-known. Some such pistol-grip portable scanners are illustrated in U.S. Pat. No. 5,200,597, "Digitally Controlled System For Scanning And Reading Bar Codes" issued to Eastman, et al. on Apr. 6, 1993, U.S. Pat. No. 5,508,505, "Holder For Handheld Portable Bar Code Scanner" issued to Walts, et al. on Apr. 16, 1996; and U.S. Pat. No. 5,576,531, "Hand Held Bar Code Scanning Device Having A Manually Operated Optical Trigger Switch" issued to Murphy on Nov. 19, 1996, all of which are incorporated herein by reference. These and other portable scanners are easily misplaced, and if set down in a traffic area, may become lost or crushed under vehicles or inventory. Accordingly, such portable scanners are often secured in cradles, many of which permit bar code scanning through the cradle.

However, known cradles are limited in their ability to provide efficient and reliable security for such portable bar code scanners.

SUMMARY OF THE INVENTION

The present invention is a present invention is a scanner cradle that overcomes limitations of the prior art for securing a portable handheld UPC bar code scanner.

According to one aspect of the invention, the scanner cradle includes a receiver formed as a cup shaped container having an interior cavity sized to receive a hand-held scanner device thereinto with the head portion of the scanner device seated therein and a handle portion thereof protruding therefrom, wherein the receiver further includes: an opening communicating with the interior cavity and a slot formed through a sidewall thereof extending partially therealong along, and an aperture communicating through a bottom thereof opposite of the opening; opposing friction members protruding into the slot from opposite walls thereof; and a releasable retention joint between each of the friction members and the walls of the slot.

According to another aspect of the invention, the retention joint of the scanner cradle further includes a retention socket formed in either one of the slot of the cup or the friction member, and a cooperating retention tail formed on a different one of either the friction member or the slot of the cup.

According to another aspect of the invention, the friction member of the scanner cradle further includes a friction member formed from the group of friction members comprising: a foam friction member, a brush friction member, and an elastomeric friction member comprising a plurality of fins.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 7 illustrates the friction members of the scanner cradle of FIG. 1 being an assembly of two or more parts, for example an assembly of a frame component and a friction component;

FIG. 8 illustrates the assembly of the frame component and the friction component for forming one of the friction members of the scanner cradle of FIG. 1;

DETAILED DESCRIPTION OF PREFERRED EMBODIMENT

As required, a detailed illustrative embodiment of the present protective enclosure is disclosed herein. However, techniques, systems and operating structures in accordance with the present protective enclosure may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present protective enclosure. The following presents a detailed description of an illustrative embodiment (as well as some alternative embodiments) of the present protective enclosure.

In the Figures, like numerals indicate like elements.

Figure 1:
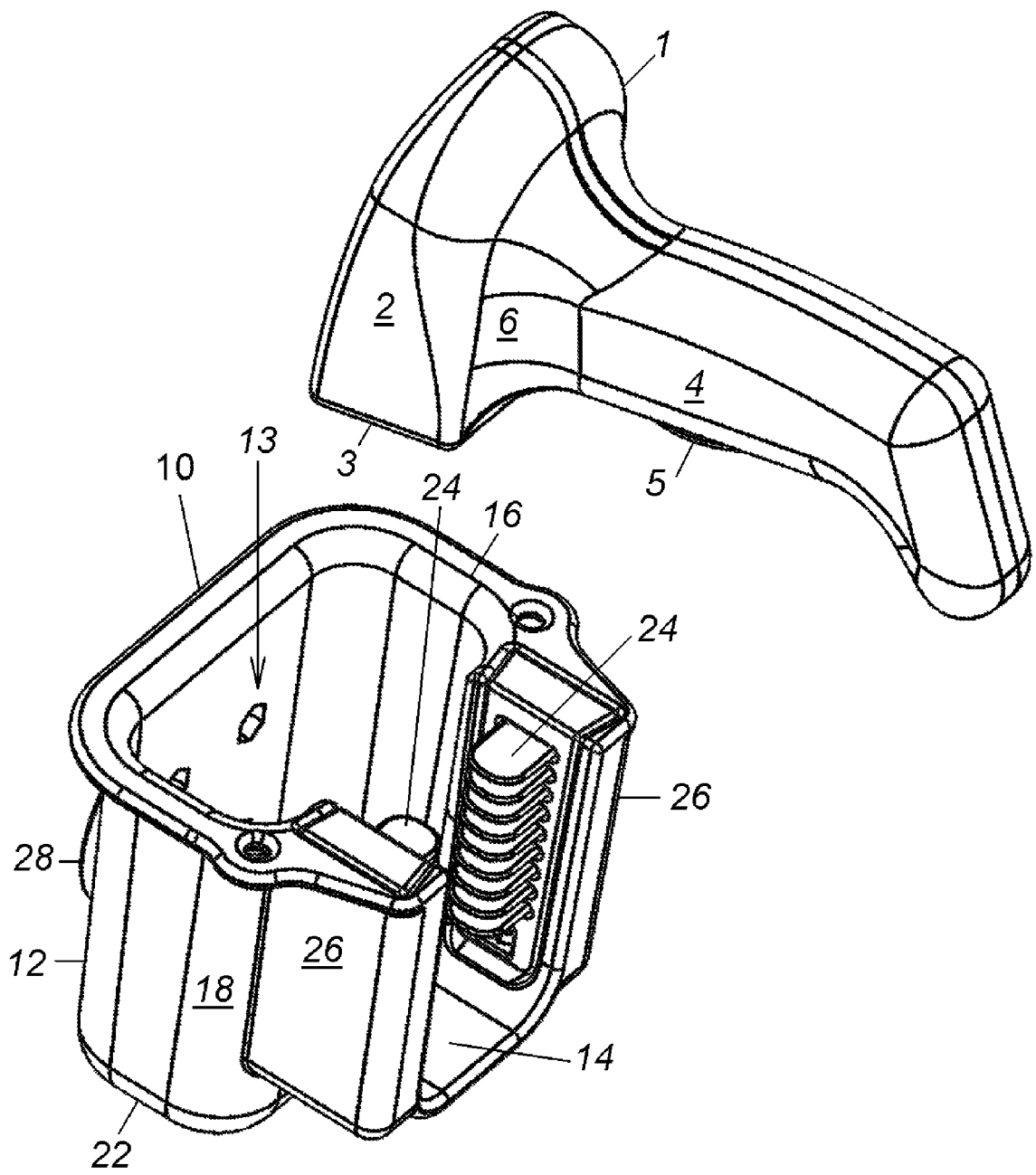
FIG. 1 illustrates the invention embodied by example and without limitation as a scanner cradle for securing a handheld portable UPC bar code scanner device.

FIG. 1 illustrates one embodiment of the invention for securing a conventional handheld portable UPC bar code scanner 1 as described in U.S. Pat. No. 7,525,696 issued Apr. 28, 2009, to Jeffrey D. Carnevali, the inventor of the present invention, the entire disclosure of which is incorporated herein by reference. Handheld portable UPC bar code scanner 1 illustrated in FIG. 1 is of a type well-known in the art, as described by example and without limitation in U.S. Pat. No. 5,576,531, HAND HELD BAR CODE SCANNING DEVICE HAVING A MANUALLY OPERATED OPTICAL TRIGGER SWITCH, and U.S. Pat. No. 5,508,505, HOLDER FOR HANDHELD PORTABLE BAR CODE SCANNER, both of which are incorporated herein by reference.

Handheld portable UPC bar code scanner device 1 includes a head 2 having a bar code scanner 3 installed therein. A handle 4 containing a trigger mechanism 5 intersects the head 2 at a shoulder surface 6 of the bottom of the head 2 by which the scanner device 1 is supported by the user's hand when the handle 4 is enclosed in the user's fingers.

FIG. 1 illustrates the invention embodied by example and without limitation as a scanner cradle 10 for securing handheld portable UPC bar code scanner device 1. Scanner cradle 10 is embodied as a receiver 12 that is formed with an interior cavity 13 adapted to receive thereinto hand-held scanner device or gun 1 with head portion 2 of scanner device 1 seated therein with handle portion 4 thereof protruding therefrom. Here receiver 12 is shaped generally as a cup formed with a slot 14 into interior cavity 13 and communicating with an opening 16 thereinto and extending partially along a sidewall 18 thereof. A viewing aperture 20 formed through a bottom 22 thereof opposite of opening 16. Additionally, one or more friction members 24 protrude into slot 14.

Here, slot 14 is formed with opposing walls 26 that project from receiver sidewall 18 on either side of slot 14. Projected walls 26 extend outwardly of receiver sidewall 18 and include friction members 24. Friction members 24 are positioned at interior of opposing walls 26 of cup slot 14.

Scanner cradle 10 also includes a mounting interface 28 for attachment to an external support.

Figure 2:
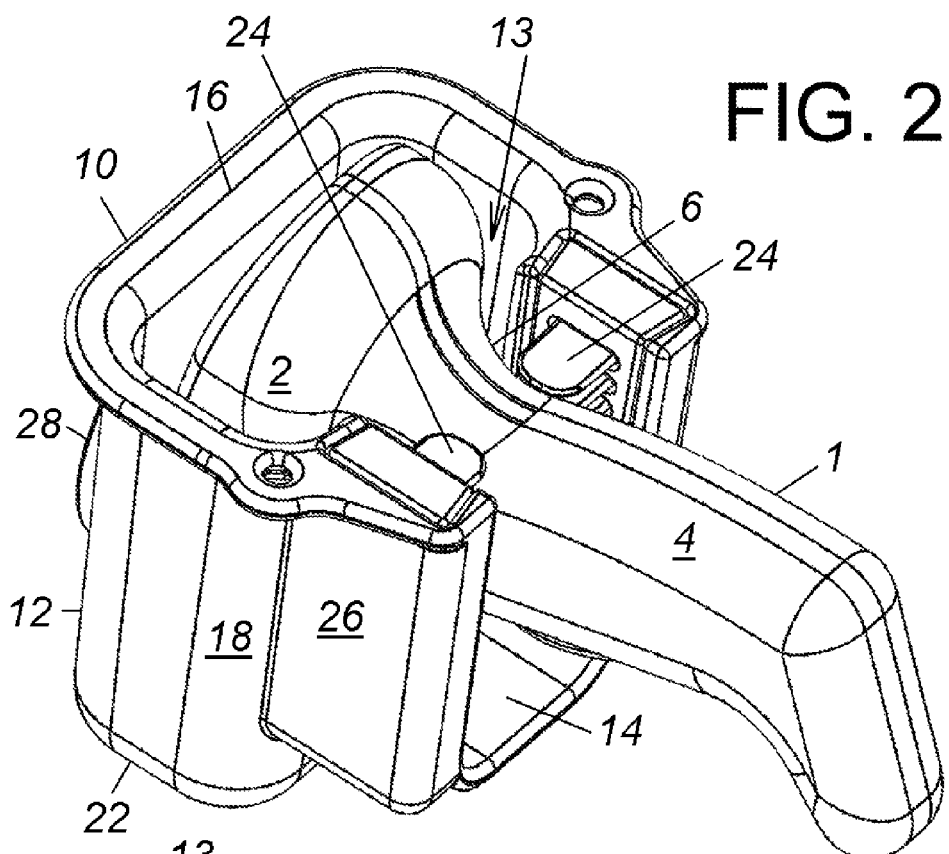
FIG. 2 and FIG. 3 are different views showing the handheld portable UPC bar code scanner device installed in the scanner cradle of FIG. 1 with its handle extended through a slot between opposing projected walls thereof and retained by between friction members.
Figure 3:
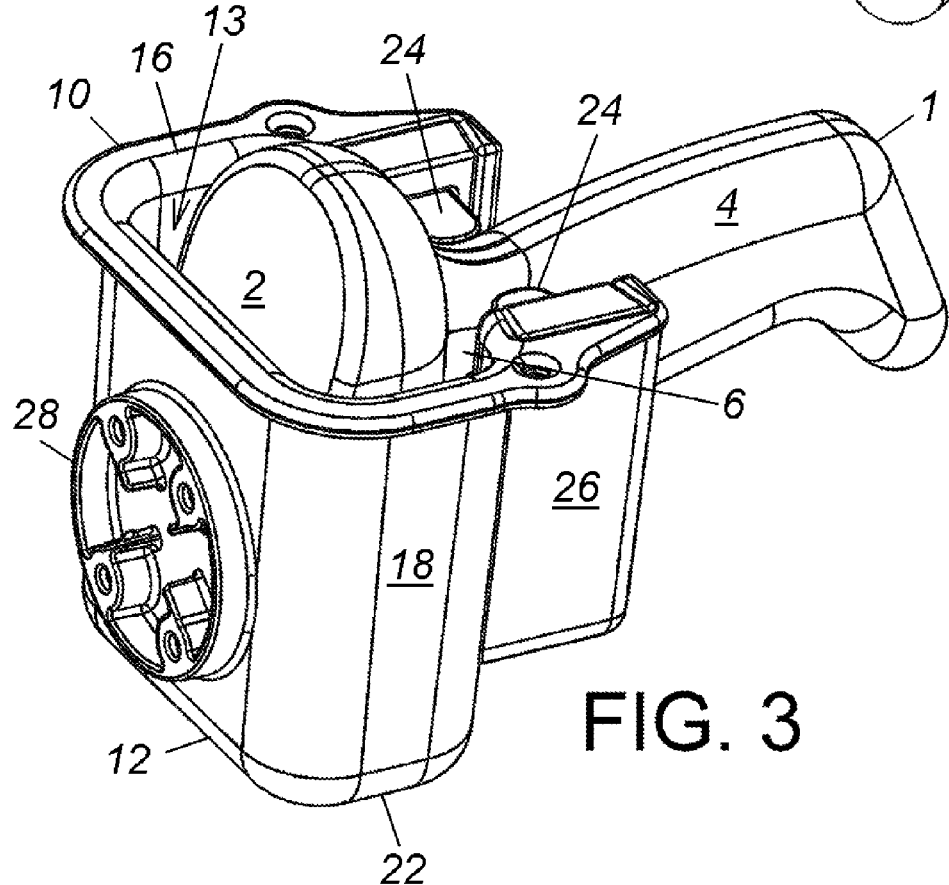

FIG. 2 and FIG. 3 are different views showing scanner device 1 installed in scanner cradle 10 with handle 4 extended through slot 14 between opposing projected walls 26 thereof. Accordingly, handle 4 passes between friction members 24 in one or both (shown) of opposing walls 26. Friction members 24 are adapted as means for retaining scanner device 1 in receiver 12 of scanner cradle 10 by gripping handle 4 thereof adjacent shoulder 6.

Figure 4:
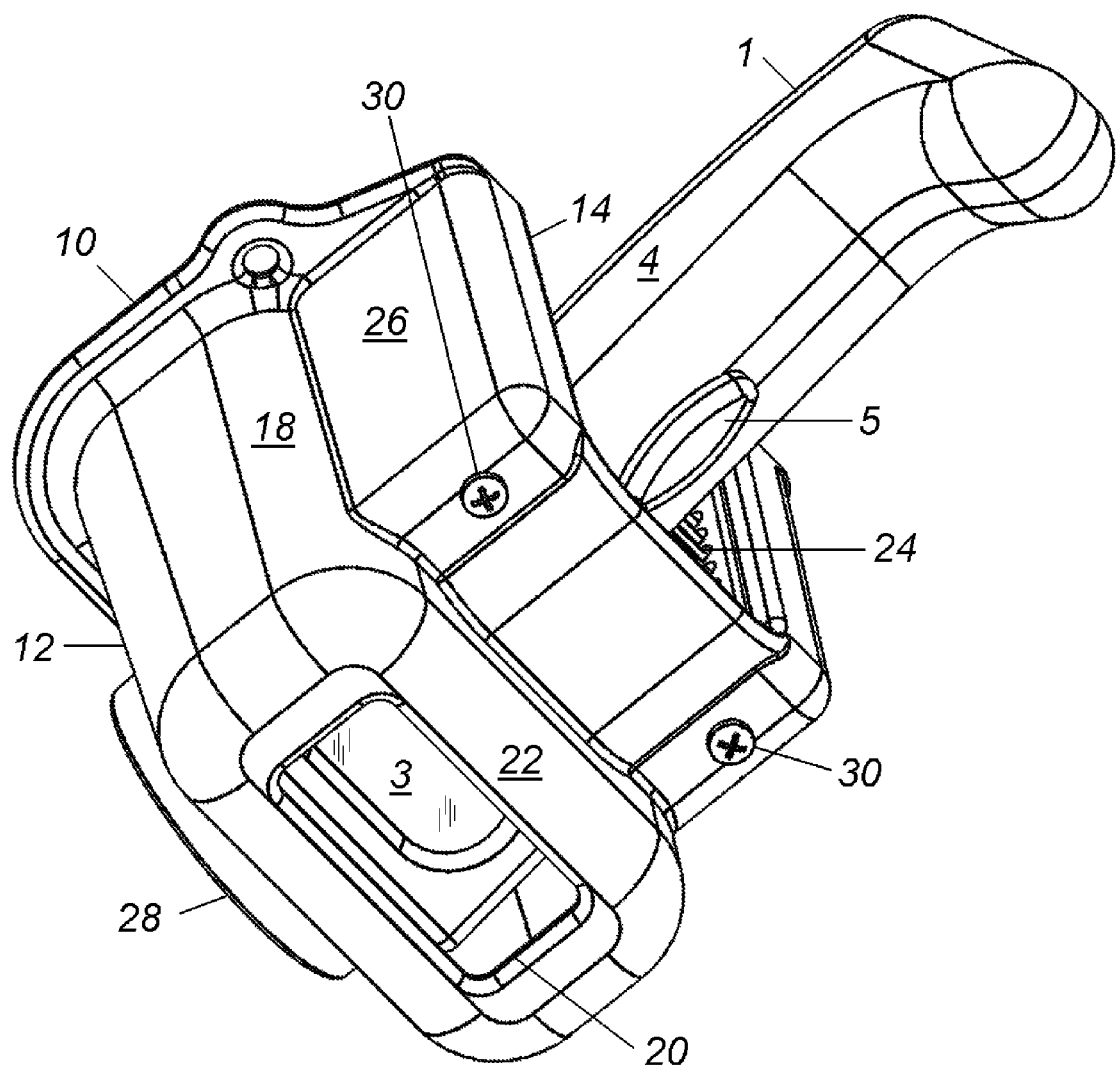
FIG. 4 is another different view showing the handheld portable UPC bar code scanner device installed in the scanner cradle of FIG. 1 with its handle extended through the slot between opposing projected walls thereof and retained by between friction members.

FIG. 4 is another different view showing scanner device 1 installed in scanner cradle 10 with handle 4 extended through slot 14 between opposing projected walls 26 thereof. Therefore, handle 4 passes between friction members 24 in one or both (shown) of interior of opposing slot walls 26. Friction members 24 retain scanner device 1 in receiver 12 of scanner cradle 10 by gripping handle 4 thereof adjacent shoulder 6. Accordingly, bar code scanner 3 of scanner device 1 is retained in position for operating through viewing aperture 20 formed through bottom 22 of receiver 12 of scanner cradle 10 opposite of opening 16 thereof.

As illustrated by example and without limitation, a retaining means 30 operates for retaining each of the one or more friction members 24 in projected walls 26 of slot 14 of receiver cup 12. For example, a fastener operates as retaining means 30.

Figure 5:
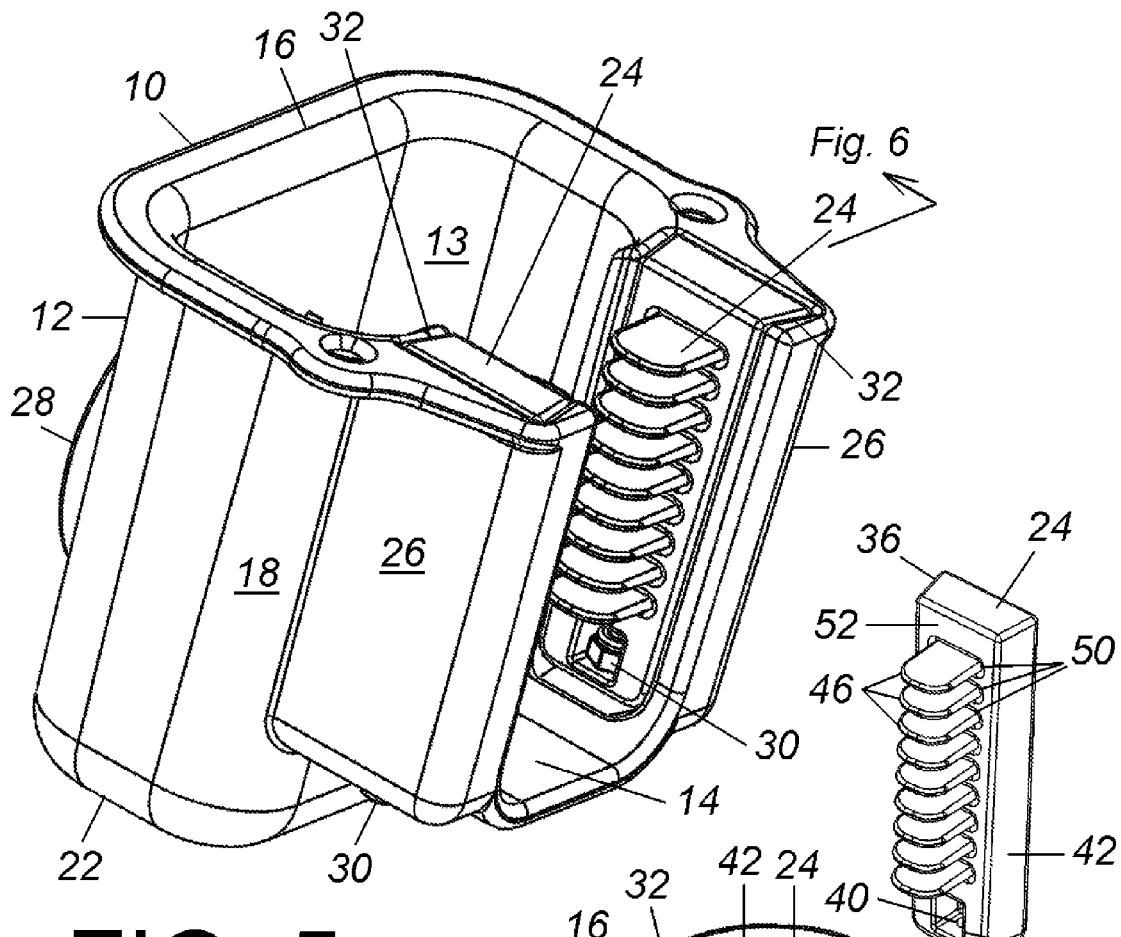
FIG. 5 illustrates the scanner cradle of FIG. 1 with the handheld portable UPC bar code scanner device removed for clarity.

FIG. 5 shows scanner cradle 10 with scanner device 1 removed for clarity. As illustrated by example and without limitation here and in combination with FIG. 4, an exterior screw cooperates with an interior nut as means for retaining 30 each of the one or more friction members 24 in interior of projected walls 26 of slot 14 of receiver cup 12. Additionally, a retention joint 32 is optionally formed between friction members 24 and interior of projected walls 26 of slot 14.

Figure 6:
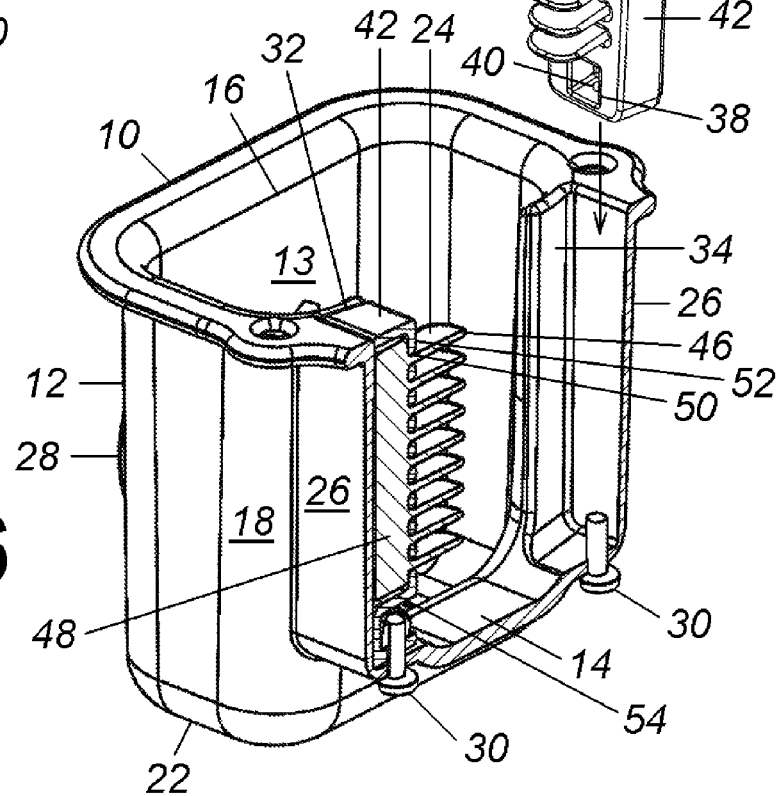
FIG. 6 shows a cross-section view through the friction members and projected walls of the slot of the scanner cradle of FIG. 1, wherein a releasable retention joint is illustrated as being a dovetail joint formed of a retention socket formed in the projected walls of the slot and a cooperating retention tail formed on the friction members.

FIG. 6 shows a cross-section view through friction members 24 and projected walls 26 of slot 14, as shown in FIG. 5. Retention joint 32 is shown as being formed of a retention socket 34 formed in either one of friction members 24 or projected walls 26 of slot 14 of receiver cup 12 (shown), and a cooperating retention tail 36 formed on a different one of either projected walls 26 of cup slot 14, or friction members 24 (shown). According to one embodiment, retention joint 32 is for example a dovetail joint, also known as a swallow-tail joint or fantail joint, formed between friction members 24 and interior of projected walls 26 of slot 14 of receiver cup 12.

FIG. 6 additionally shows friction members 24 as being further removable from slot 14 of receiver cup 12, for example and without limitation by sliding along cooperating retention tail 36 or retention socket 34 (shown). Retaining means 30 are positioned for retaining friction members 24 in slot 14. According to one embodiment, a nut pocket 38 is formed in an end of friction member 24 in alignment with an aperture 40 sized to receive therethrough a screw portion of retaining means 30.

FIG. 7 illustrates friction members 24 being an assembly of two or more parts. For example, friction member 24 is an assembly of a frame component 42 and a friction component 44. For example, friction component 44 includes a plurality of spaced-apart fins 46 extended from a base 48. Fins 46 and base 48 of friction component 44 are optionally formed of an elastomeric material, or another resiliently elastic material, such as foam. Fins 46 are sized and positioned on base 48 of friction component 44 to be received through a like plurality of slots or other apertures 50 formed in a surface 52 of frame component 42. Additionally, base 48 of friction component 44 is sized to be received into a cavity 54 formed in frame component 42 behind surface 52, as more clearly shown in FIG. 6. Accordingly, friction component 44 is assembled into cavity 54 of frame component 42 with fins 46 protruding from frame surface 52 through respective slot apertures 50, as shown in FIG. 8.

Figures 9A, 9B:
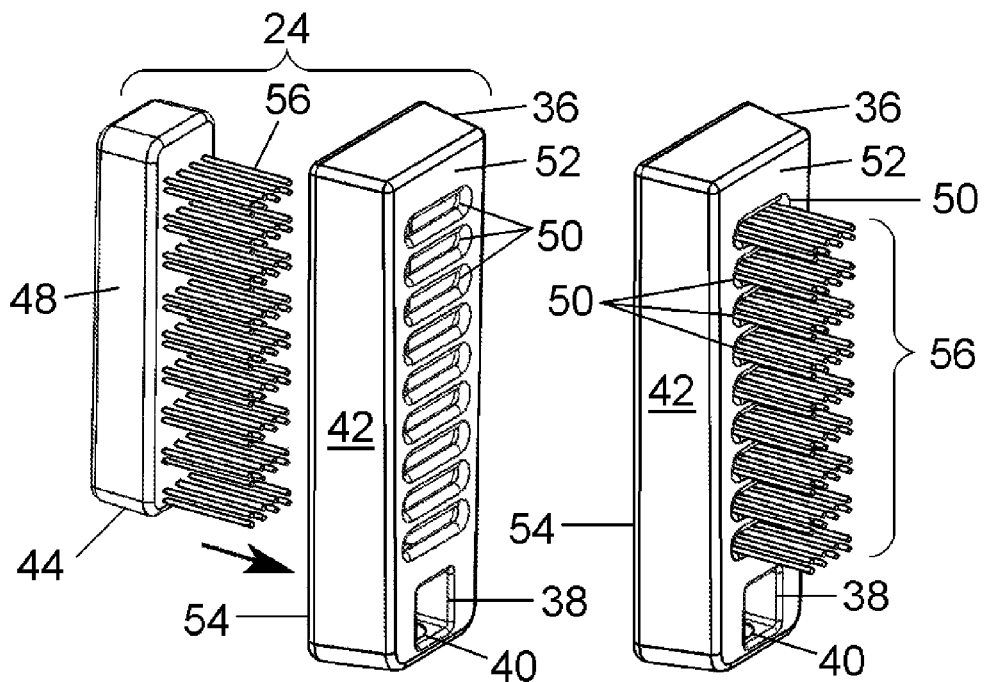
FIG. 9A illustrates the friction members of the scanner cradle of FIG. 1 being an assembly of two or more parts, wherein the friction component is alternatively configured as a brush configured to mate with the friction component.
FIG. 9B illustrates the assembly of the frame component and the brush-type friction component for forming one of the friction members of the scanner cradle of FIG. 1.

FIG. 9A illustrates one alternative embodiment of friction members 24 wherein friction component 44 is alternatively configured as a brush. Accordingly, fins 46 of friction component 44 are replaced with brush bristles 56, wherein brush bristles 56 are spaced apart in either individual rows or groups of rows (shown). Individual or grouped rows of brush bristles 56 are positioned on base 48 of friction component 44 similarly to spaced-apart fins 46. Additionally, individual or grouped rows of brush bristles 56 are sized to be received through respective ones of like plurality of slots or other apertures 50 formed in surface 52 of frame component 42 to form assembly of alternative friction members 24, as shown in FIG. 9B.

Accordingly, brush bristles 56 of alternative friction members 24 protrude into slot 14 similarly to fins 46 as shown in Figures and effectively retain scanner device 1 in receiver 12 of scanner cradle 10 by gripping handle 4 thereof adjacent shoulder 6 similarly to fins 46 as disclosed herein.

Figures 9C, 9D:
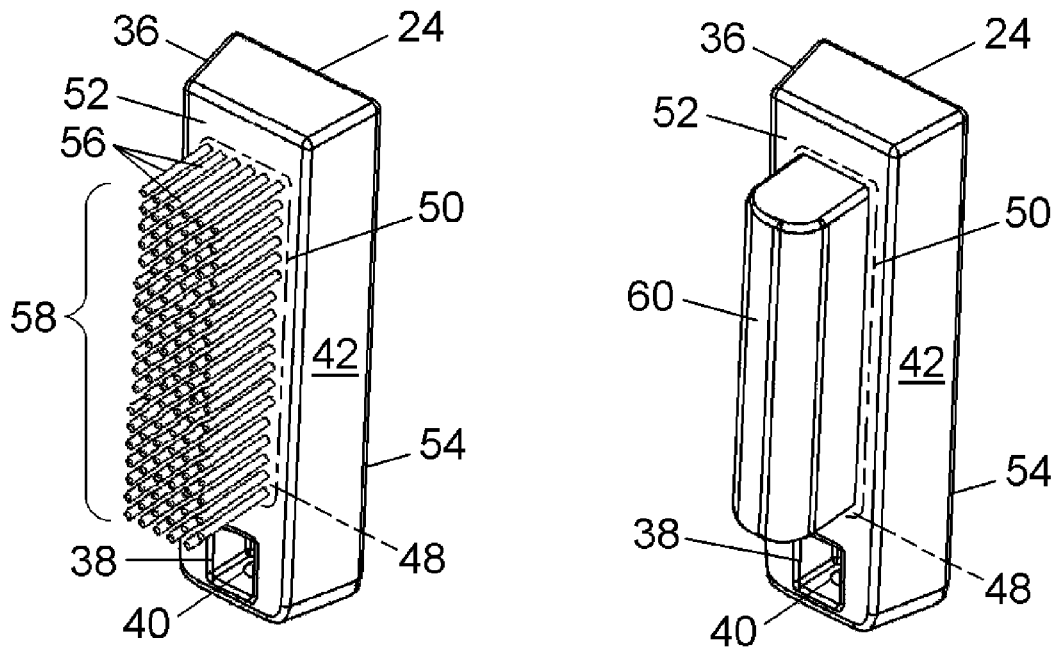
FIG. 9C illustrates another alternative embodiment of the friction members of the scanner cradle of FIG. 1, wherein the friction component is alternatively configured as a different brush including the frame component.
FIG. 9D illustrates another alternative embodiment of the friction members of the friction members of the scanner cradle of FIG. 1, wherein the fins of the friction component are replaced with a resilient foam pad.

FIG. 9C illustrates another alternative embodiment of friction members 24 wherein friction component 44 is alternatively configured as a different brush. Accordingly, individual or grouped rows of brush bristles 56 of friction component 44 are grouped together to form a solitary brush formed of brush bristles 56. By example and without limitation, brush bristles 56 are projected from surface 52 of frame component 42 in positions similar to spaced-apart fins 46 and rows of brush bristles 56 such that solitary brush 58 protrudes into slot 14 similarly to fins 46 as shown in Figures.

Alternatively, brush bristles 56 of brush 58 are either adhered to base 48 of frame component 42 and inserted through optional elongated opening 50 (phantom) in surface 52 thereof, else brush 58 is formed as a solitary member having brush bristles 56 projecting from base 48 (shown through optional opening 50).

Accordingly, brush 58 of alternative friction members 24 effectively retains scanner device 1 in receiver 12 of scanner cradle 10 by gripping handle 4 thereof adjacent shoulder 6 similarly to fins 46 as disclosed herein.

FIG. 9D illustrates another alternative embodiment of friction members 24 wherein fins 46 of friction component 44 are replaced with a resilient foam pad 60. By example and without limitation, foam pad 60 is adhered to or otherwise projected from surface 52 of frame component 42 in a position similar to fins 46 and brushes 56 such that foam pad 60 protrudes into slot 14 similarly to fins 46 as shown in Figures.

Alternatively, foam pad 60 is adhered to or otherwise projected from base 48 (shown through optional opening 50) of frame component 42 and inserted through optional elongated opening 50 in surface 52 thereof. Otherwise, foam pad 60 is formed as a solitary member which includes base 48, thereby forming friction component 44 of friction component base 48 with foam pad 60 projected therefrom.

Accordingly, foam pad 60 of alternative friction members 24 effectively retains scanner device 1 in receiver 12 of scanner cradle 10 by gripping handle 4 thereof adjacent shoulder 6 similarly to fins 46 as disclosed herein.

Figure 10:
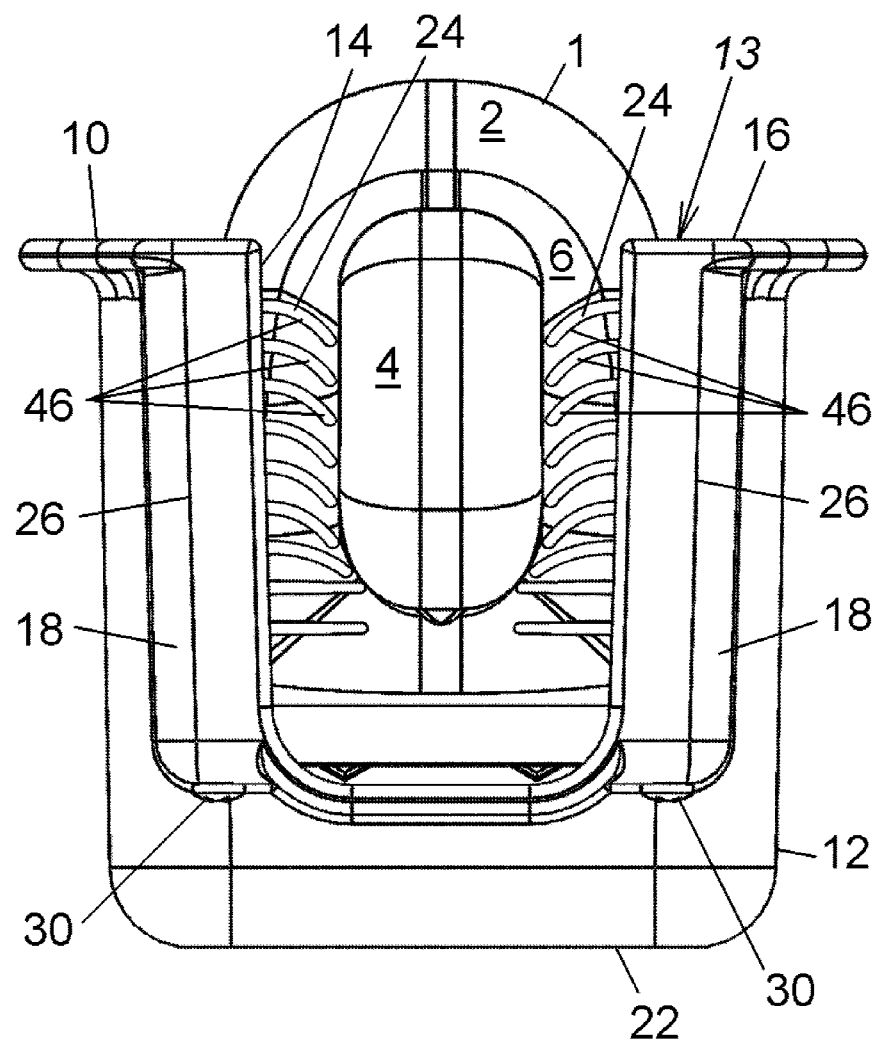
FIG. 10 is another different view showing the handheld portable UPC bar code scanner device installed in the scanner cradle of FIG. 1 with its handle extended through the slot between opposing projected walls thereof and retained by between friction members, wherein the handle of the UPC bar code scanner device is shown seated in the slot of the scanner cradle and retained therein slot by passing between the opposing friction members protruding inwardly of the slot, and wherein the friction members deform to receive the scanner device handle and retain it by friction contact therewith.

FIG. 10 is a view along handle 4 of handheld portable UPC bar code scanner device 1 as installed into scanner cradle 10. FIG. 10 illustrates scanner head 2 positioned within interior cavity 13 of receiver 12. Handle 4 is shown seated in slot 14 through sidewall 18 and communicating with interior cavity 13. Handle 4 is retained in slot 14 by being passed between friction members 24 protruding inwardly from one or both (shown) of opposing walls 26. As shown, friction members 24 deform to receive handle 4, then retain handle 4 by friction contact therewith.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A scanner cradle, comprising:
a receiver adapted to receive a hand-held scanner device thereinto with a head portion of the scanner device seated therein and a handle portion thereof protruding therefrom, wherein the receiver comprises: a cup formed with an opening thereinto and an aperture formed through a bottom thereof opposite of the opening, and a slot communicating with the opening thereinto and extending partially along a sidewall thereof between the opening of the cup and the aperture in the bottom; and one or more friction members protruding into the slot.

2. The scanner cradle of claim 1, wherein the one or more friction members are further removable from the cup.

3. The scanner cradle of claim 1, further comprising means for retaining the one or more friction members in the slot of the cup.

4. The scanner cradle of claim 3, further comprising a retention joint between the one or more friction members and the slot of the cup.

5. The scanner cradle of claim 4, wherein the retention joint further comprises a retention socket formed in either one of the slot of the cup or the one or more friction members, and a cooperating retention tail formed on a different one of either the one or more friction members or the slot of the cup.

6. The scanner cradle of claim 5, wherein the retention joint further comprises a dovetail tail joint formed between the one or more friction members and the slot of the cup.

7. The scanner cradle of claim 6, wherein the slot of the cup further comprises the retention socket, and the one or more friction members further comprises the cooperating retention tail.

8. The scanner cradle of claim 1, wherein the one or more friction members further comprise a frame and a friction component.

9. The scanner cradle of claim 1, wherein the one or more friction members further comprise a friction member formed from the group of friction members comprising: a foam friction member, a brush friction member, and an elastomeric friction member comprising a plurality of fins.

10. A scanner cradle, comprising:
a receiver formed with an interior cavity sized to receive a hand-held scanner device thereinto with a head portion of the scanner device seated therein and a handle portion thereof protruding therefrom, wherein the receiver comprises: a cup formed with the interior cavity communicating with an opening thereinto and an aperture communicating through a bottom thereof opposite of the opening, and a slot formed through a sidewall of the cup in communication and sized to receive the handle of the scanner device thereinto, with the opening and extending partially along the sidewall toward the bottom of the cup; and
a friction member protruding into the slot and removable therefrom.

11. The scanner cradle of claim 10, wherein the friction members are further retainable in the slot of the cup.

12. The scanner cradle of claim 11, wherein the friction members further form a retention joint with the slot of the cup.

13. The scanner cradle of claim 12, wherein the retention joint further comprises a retention socket formed in either one of the slot of the cup or the friction member, and a cooperating retention tail formed on a different one of either the friction member or the slot of the cup.

14. The scanner cradle of claim 13, wherein the retention joint further comprises a dovetail tail joint formed between the friction member and the slot of the cup.

15. The scanner cradle of claim 14, wherein the slot of the cup further comprises the retention socket, and the friction member further comprises the cooperating retention tail.

16. The scanner cradle of claim 10, wherein the friction member further comprises a frame and a friction component.

17. The scanner cradle of claim 10, wherein the friction member further comprises a friction member formed from the group of friction members comprising: a foam friction member, a brush friction member, and an elastomeric friction member comprising a plurality of fins.

18. A scanner cradle, comprising:
a receiver formed as a cup shaped container having an interior cavity sized to receive a hand-held scanner device thereinto with the head portion of the scanner device seated therein and a handle portion thereof protruding therefrom, wherein the receiver further comprises: an opening communicating with the interior cavity and an aperture communicating through a bottom thereof opposite of the opening, and a slot formed through a sidewall of the cup the slot being sized to receive the handle portion of the thereinto, and the slot extending partially along the sidewall toward the bottom of the cup;
opposing friction members protruding into the slot from opposite walls thereof; and
a releasable retention joint between each of the friction members and the walls of the slot.

19. The scanner cradle of claim 18, wherein the retention joint further comprises a retention socket formed in either one of the slot of the cup or the friction member, and a cooperating retention tail formed on a different one of either the friction member or the slot of the cup.

20. The scanner cradle of claim 19, wherein the friction member further comprises a friction member formed from the group of friction members comprising: a foam friction member, a brush friction member, and an elastomeric friction member comprising a plurality of fins.

* * * * *